No. 876,664. PATENTED JAN. 14, 1908.
W. J. SMITH.
COTTON CHOPPER AND CULTIVATOR.
APPLICATION FILED APR. 17, 1907.
2 SHEETS—SHEET 1.
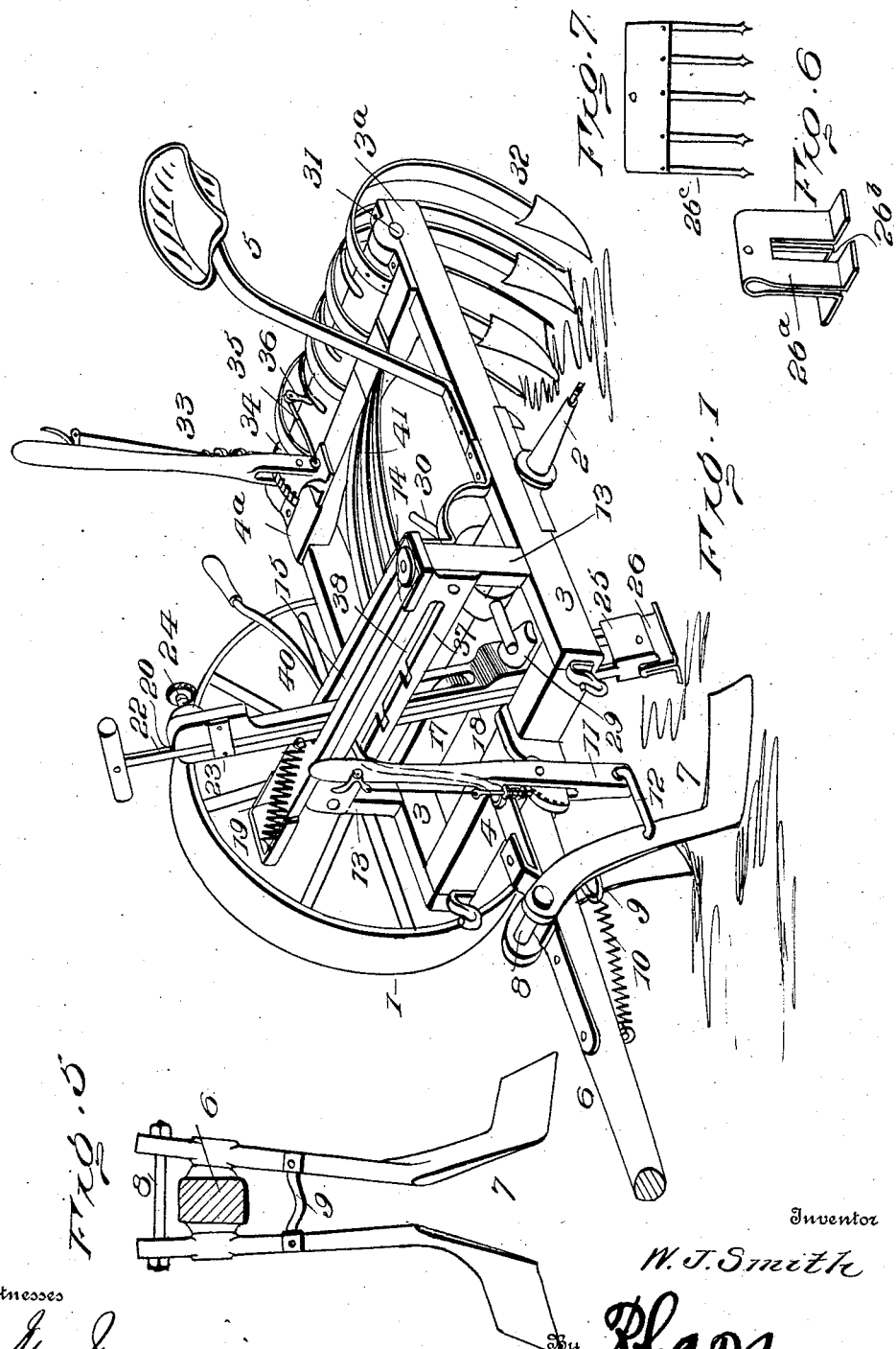
Witnesses
Inventor
W. J. Smith
By R. H. A. B. Lacey,
Attorneys No. 876,664. PATENTED JAN. 14, 1908.
W. J. SMITH.
COTTON CHOPPER AND CULTIVATOR.
APPLICATION FILED APR. 17, 1907.
2 SHEETS—SHEET 2.
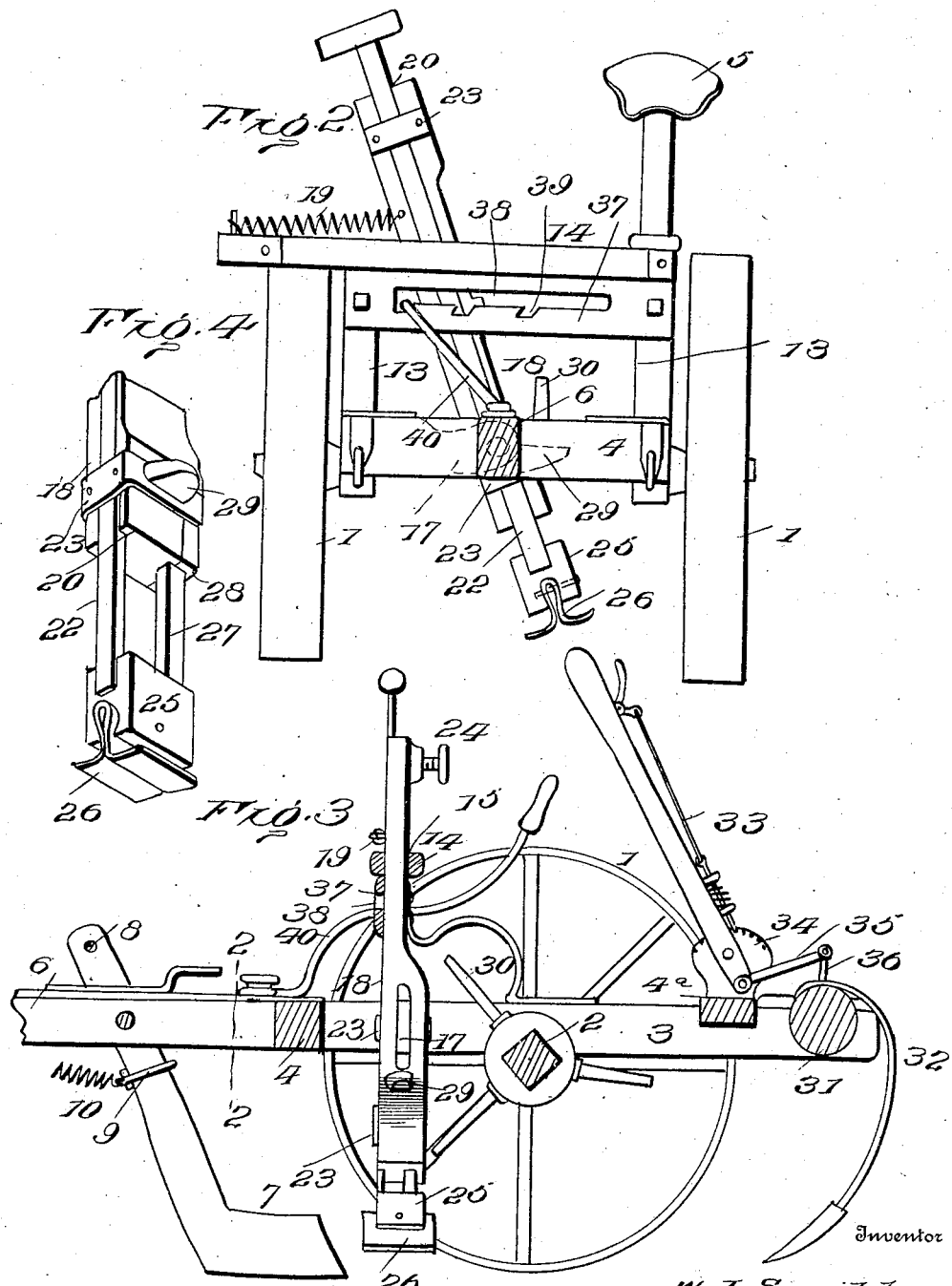
Witnesses
Inventor
W. J. Smith
By 
Attorneys
THE NORRIS PETERS CO., WASHINGTON, D. C.

UNITED STATES PATENT OFFICE.

WILLIAM JASPER SMITH, OF REDBOILING SPRINGS, TENNESSEE.

COTTON CHOPPER AND CULTIVATOR.

No. 876,664.  Specification of Letters Patent.  Patented Jan. 14, 1908.

Application filed April 17, 1907. Serial No. 368,730.

*To all whom it may concern:*

Be it known that I, WILLIAM JASPER SMITH, citizen of the United States, residing at Redboiling Springs, in the county of Macon and State of Tennessee, have invented certain new and useful Improvements in Cotton Choppers and Cultivators, of which the following is a specification.

This invention has for its object an improved cotton chopper and cultivator combined, which will chop the young cotton and which is provided with scrapers of the disk or plate variety that will work in front of the chopper and cut off weeds, grass and the like, from the row, and carry it to one side or the other, leaving the young cotton in a narrow space, while the chopper follows the scrapers and does its work, a spring toothed harrow being mounted on the rear of the machine and cultivating the ground after the chopping operation by throwing the earth back to the cotton, leaving it in good condition.

The invention consists in certain constructions, arrangements and combinations of parts that I shall hereinafter fully describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a perspective view of my improved cotton chopper and cultivator. Fig. 2 is a sectional view thereof, the section being taken on the line 2—2 of Fig. 3. Fig. 3 is a longitudinal sectional view of the machine. Fig. 4 is a detail view of the hoe stock. Fig. 5 is a detail sectional view of the scrapers, and Figs. 6 and 7 are views of details hereinafter specifically referred to.

Corresponding and like parts are referred to in the following description and indicated in all the views of the drawings by the same reference characters.

Referring to the drawings, the numeral 1 designates the traveling wheels of my combined cotton chopper and cultivator, and 2 the axle thereof which is journaled in a frame work that is preferably rectangular and which consists of longitudinal sills 3 and front and rear cross beams 4, 4ª.

5 designates the driver's seat which is mounted on the usual spring at one side of the frame work, and 6 designates the tongue.

Scrapers 7, which may be either of the disk or blade variety, are pivotally mounted intermediate of their ends on opposite sides of the tongue 6 and are connected at their upper ends by a rod 8 and below their pivot points by a yoke 9. A compression spring 10 is secured to the yoke 9 and extends forwardly therefrom and is also secured to the tongue 6, so as to pull forwardly upon the scrapers and carry their operative lower ends into contact with the ground. A lever 11 which is fulcrumed on a bracket extending forwardly from the frame work, is connected by a link 12 to one of the scrapers below the pivot point thereof, so as to raise the scrapers and hold them in an inoperative position, whenever desired. Standards 13 project upwardly from the longitudinal sills 3 near the front ends thereof and support a transversely extending guide bar 14 which is formed with a slot 15. A bracket 17 projects inwardly from one of the longitudinal sills 3 and on said bracket a hoe stock 18 is preferably mounted to turn about a horizontal axis, the upper end of said stock passing through the slot 15 and guided thereby. The stock 18 is normally held at one end of the slot by means of a compression spring 19 secured at one end to a pin on the stock and at its other end to a pin on the guide bar 14. The stock 18 is formed with a longitudinal groove 20 in which a hoe shank 22 is fitted and mounted to slide, being held therein in proper sliding movement by means of straps 23. A set screw 24 works through the upper end of the stock and is adapted to impinge against the shank 22 so as to hold the same at different adjusted positions, either with the hoe at different depths in the ground or entirely above the same. The shank 22 is provided at its lower end with a head 25 formed in its lower edge with a screw for the hoe blade 26 which may be provided with either one or two cutting edges, according as it is desired that the hoe shall cut one way or both ways. Said head 5 is formed with an arm 27 accommodated by a sheath 28 at the lower end of the stock 18, so as to assist in holding the hoe head perfectly rigid in operation.

The lower end of the stock 18 is formed with a laterally projecting lug 29 which is normally in the path of movement of a series of tappet arms 30, projecting laterally from the axle arms 2, so that as the machine travels forwardly, said tappet arms will successively strike the lug and rock the stock in one direction, the spring then pulling it back, so as to effect a laterally vibrating movement of the stock and thereby chop the plants.

The longitudinal sills 3 of the frame work are extended rearwardly as indicated at $3^a$, and a transverse shaft 31 is journaled at its ends in said extensions and carries a series of spring harrow teeth 32 adapted to work in the rear end of the frame and throw the earth back to the cotton so as to leave the standing plants in good condition. A hand lever 33 is mounted on the rear of the cross bar $4^a$ and is provided with a detent arranged for engagement with a segment 34 said lever being connected by a link 35 to a post 36 on the shaft 31, so as to hold the harrow teeth 32 at different depths and in an inoperative position.

A latch plate 37 is secured to the standards 13 just underneath the guide bar 14 and is provided with a transversely extending slot 38 and a series of notches 39 extending from the slot, and a latch 40 is pivoted at one end at the front of the framework and passes rearwardly through said slot across the hoe stock 18, the rear end of said latch being in convenient position for manipulation by the driver. When the latch plate is in the farthest notch, the hoe stock will be permitted to have its full swing. When it is in the next notch the hoe stock will be confined to a smaller radius, and when it is in the last notch the said stock will be held with its lug 29 completely out of the path of the tappet arms 30 and will thus be maintained in an inoperative position.

From the foregoing description in connection with the accompanying drawings, it will be seen that I have provided an efficient, simple and durable construction of combined cotton chopper and cultivator, in which the scraper blades or disks may be held at different inclinations or depths, in which the cotton chopper or hoe may be regulated as to its cut, or be held entirely in an inoperative position, either by holding the hoe stock at one limit of its movement or by raising the hoe entirely out of operative position, and in which the soil may be thrown back upon the standing plants, so as to cover the same and leave them in proper condition.

As illustrated in Fig. 6, I may substitute for the hoe 26, a modified form of hoe, designated $26^a$, which is bifurcated as shown so that it will cut all plants in the row except those that pass through the space $26^b$ in the hoe, leaving, say, two to four plants in each hill. In Fig. 7 is shown a cultivating harrow $26^c$ which may be secured within the head of the hoe stock so as to cultivate in the row.

Preferably, a protector 41, which is arched as shown, extends from the base of the driver's seat directly over the top of the arms and is bolted to the guide bars so as to prevent the operator from coming into danger or contact with the tappets 30.

Having thus described the invention, what is claimed as new is:

1. A machine of the character described, comprising a framework, standards mounted on said framework a transversely extending guide bar supported by said standards, a hoe stock pivotally mounted in the framework to vibrate transversely, the guide bar being provided with a slot and the stock passing upwardly through said slot, a spring secured to said stock and to the guide bar, and adapted to hold said guide bar at one end of the slot, a revoluble axle upon which the framework is mounted, and a series of tappets carried by the axle and adapted to strike the stock below the pivot thereof, as and for the purpose set forth.

2. A machine of the character described, comprising a traveling framework, a revoluble axle on which said framework is carried, a hoe stock pivotally mounted to vibrate transversely in said framework, a hoe carried by said stock, the stock being provided with a projecting lug, a series of tappets secured to the axle and adapted to strike said lug successively, a spring connected to said stock and designed to return the same to normal position, and means for stopping the return movement of the stock at different points in its traverse, whereby to vary the throw of said stock.

3. A machine of the character described, comprising a frame work, a revoluble axle upon which said frame work is mounted, standards mounted on said frame work, a transversely extending guide bar supported by said standards and provided with a slot, a hoe stock pivotally mounted in the frame work to vibrate transversely and passing upwardly through a slot in said guide said stock being provided with a laterally projecting lug, a hoe carried by said stock, and a series of tappets carried by the axle and adapted to successively strike said lug, and a spring connected to the stock and the guide bar and adapted to return the stock to its normal position after being struck by the tappets.

4. A machine of the character described, comprising a supporting frame work, traveling wheels therefor, and a revoluble axle for the traveling wheels and on which said frame work is mounted, standards projecting upwardly from the frame work, a transversely extending guide bar mounted on said standards and provided with a slot, a transversely vibrating hoe stock pivotally mounted intermediate of its ends in the frame work, the upper end of said stock passing through the slot in the guide bar, said stock being provided with a laterally projecting lug, a series of tappets mounted on the axle and adapted to successively strike said lug, a spring secured to said stock and the guide bar, a hoe shank carried by said stock and vertically adjustable therein, means for holding said shank at different adjustments, and a hoe carried by said shank.

5. A machine of the character described, comprising a traveling frame work, a hoe stock pivotally mounted within said frame work to vibrate in a transverse plane, said stock being provided with a groove, a hoe shank mounted in said groove and slidable therein, means for holding said shank at different elevations in the stock, said shank being provided at its lower end with a head, a hoe mounted in said head, the head being provided with an arm and the stock with a sheath adapted to accommodate said arm, and means for vibrating said stock.

6. A machine of the character described, comprising a traveling frame work, a hoe stock mounted to vibrate transversely therein, means for vibrating said stock, a hoe carried by said stock, a latch plate supported by the frame work and formed with a transversely extending slot and with notches extending from the slot, and a latch pivotally mounted on the frame work and passing through said slot and past one side of the stock, said latch being adapted for reception in different notches on the latch plate whereby to vary the throw of the stock.

In testimony whereof I affix my signature in presence of two witnesses.

W. JASPER SMITH.

Witnesses:
A. C. SABENS,
E. L. WHITLEY.